UNITED STATES PATENT OFFICE.

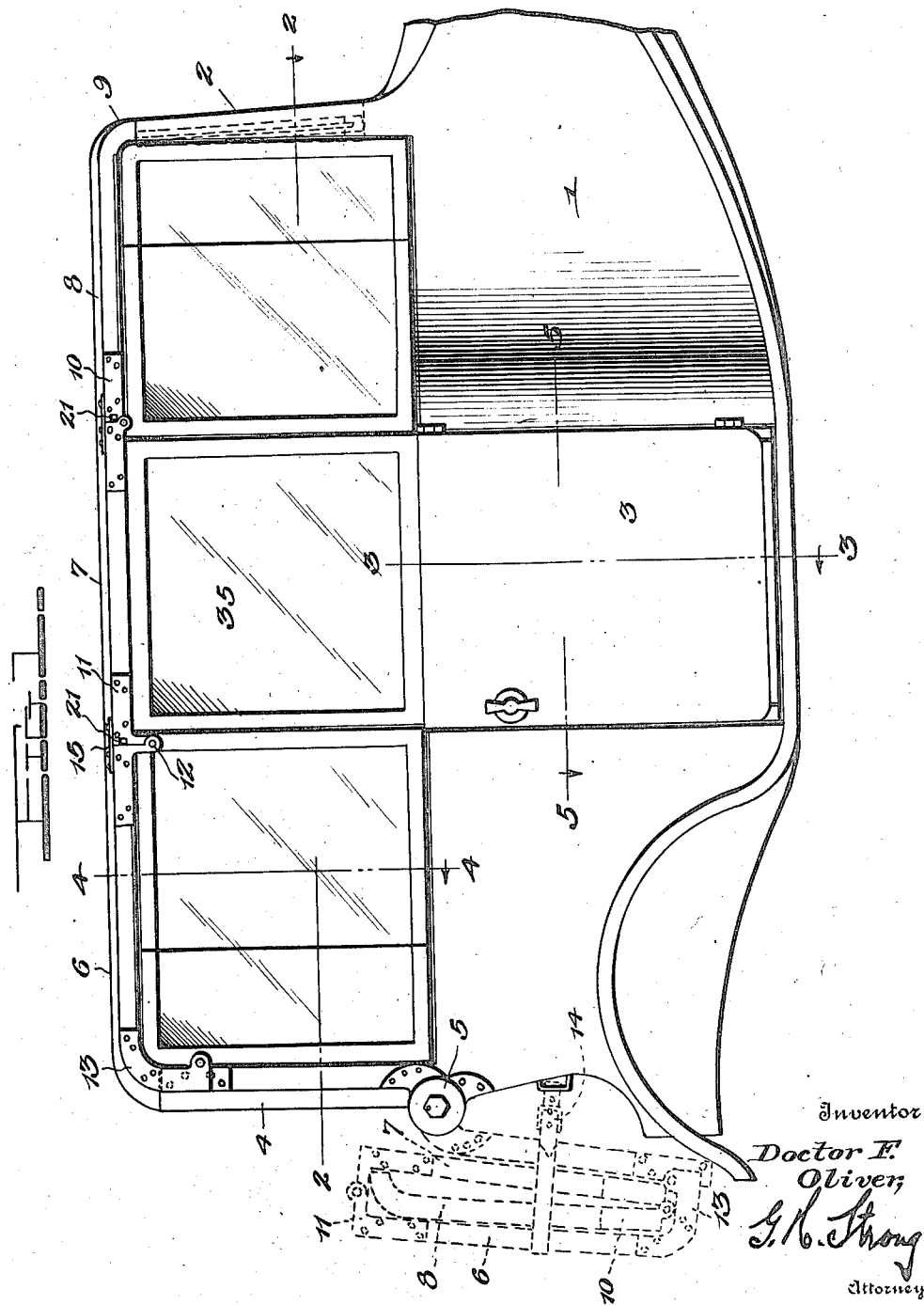

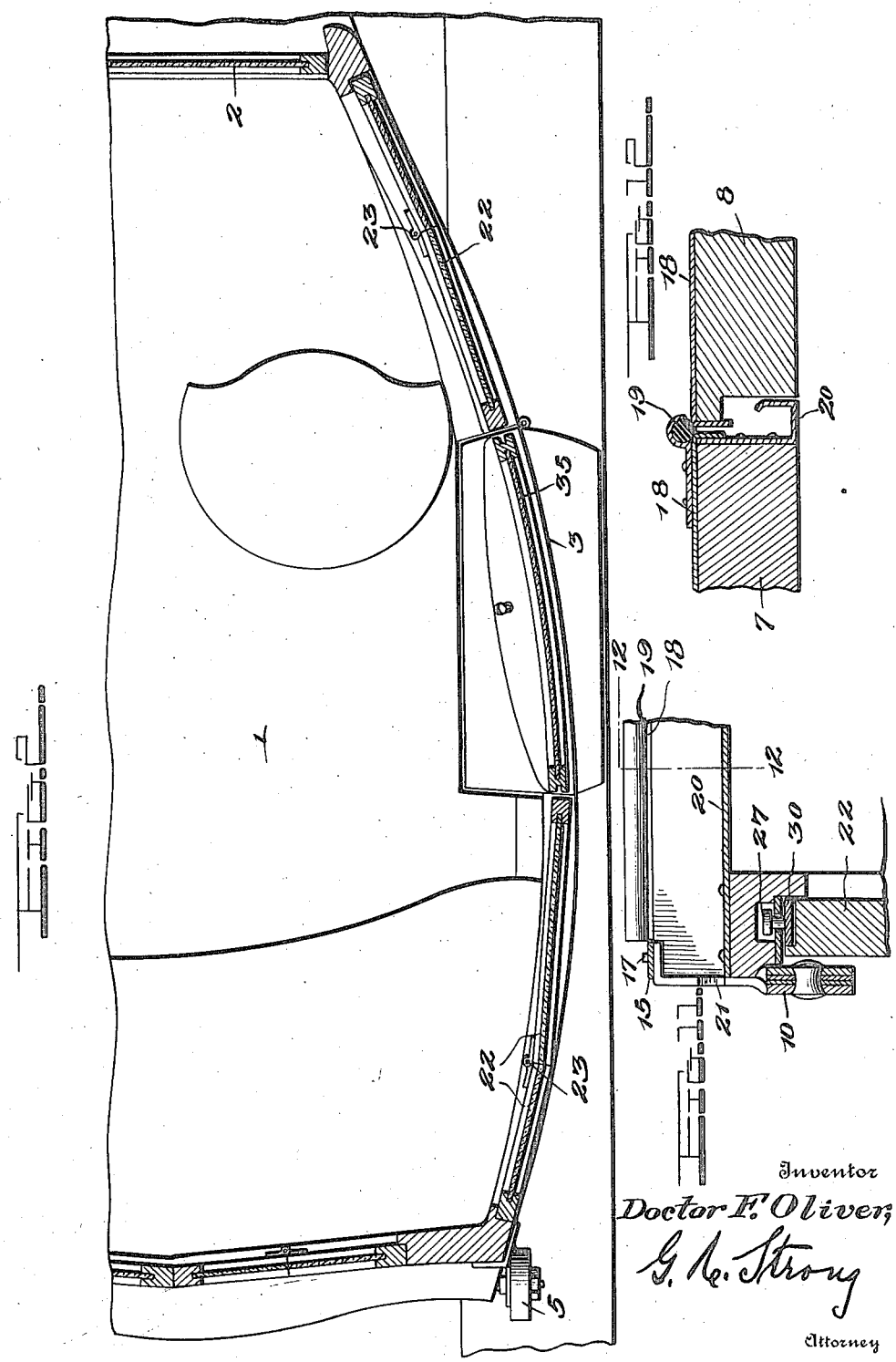

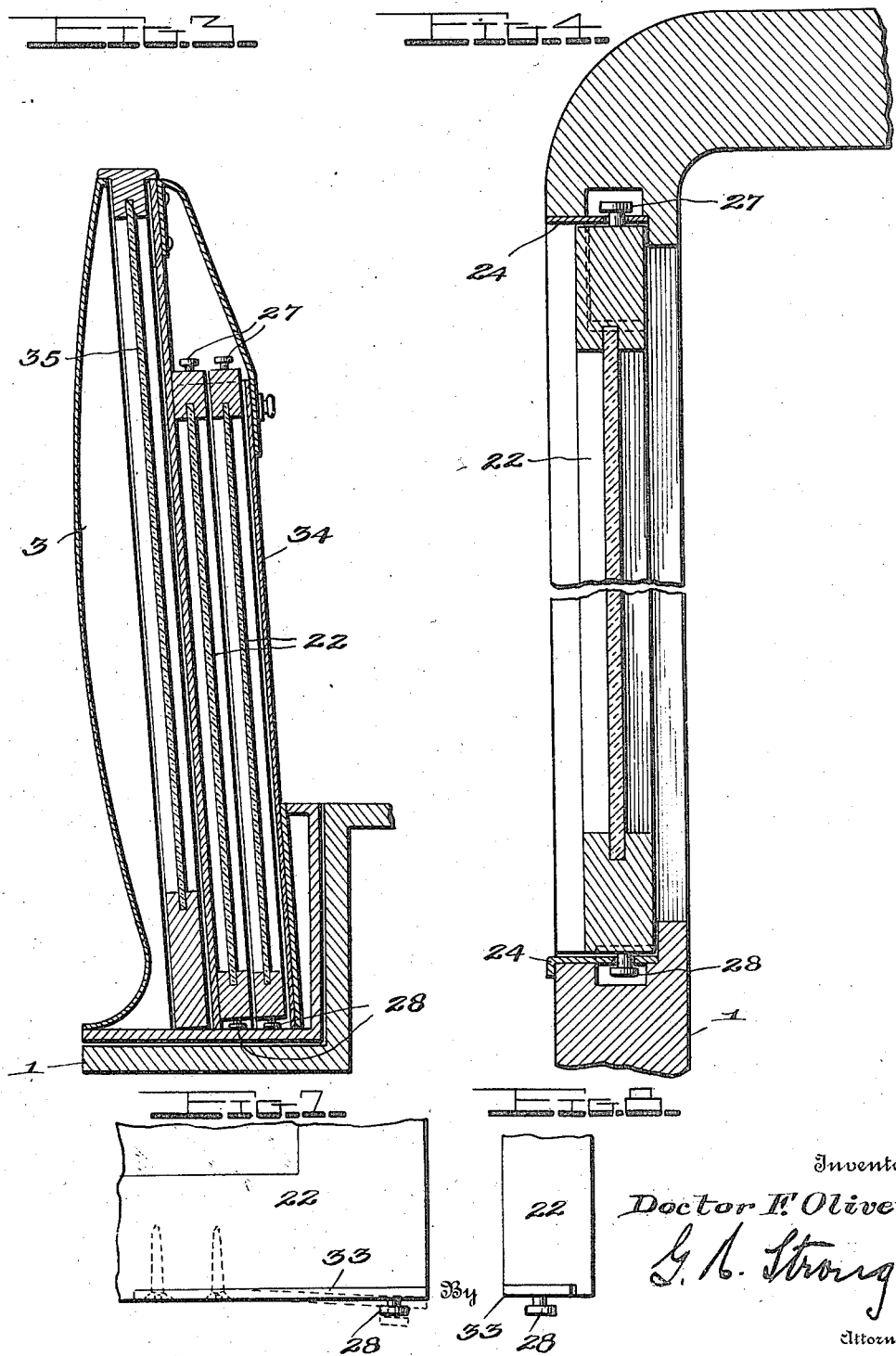

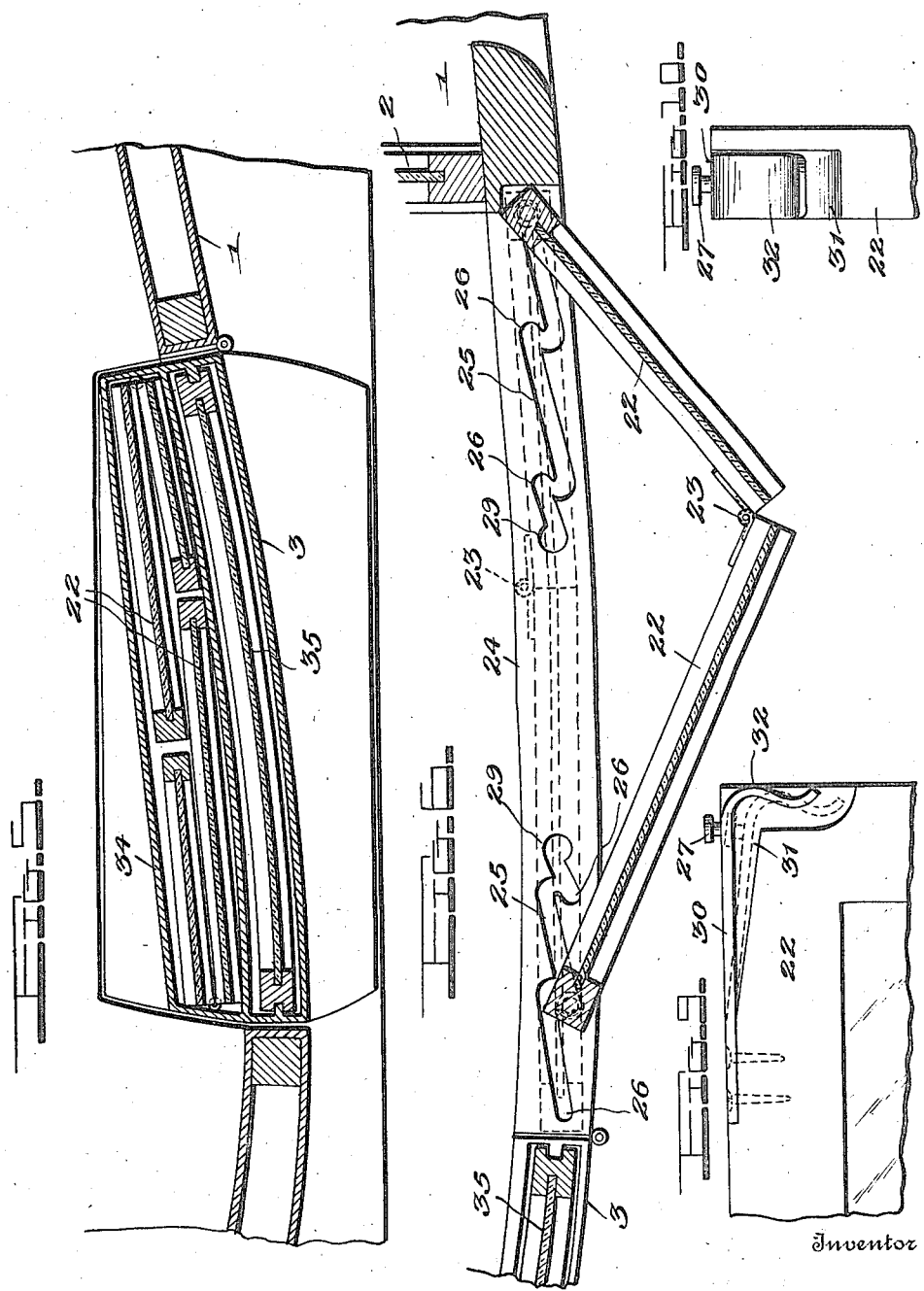

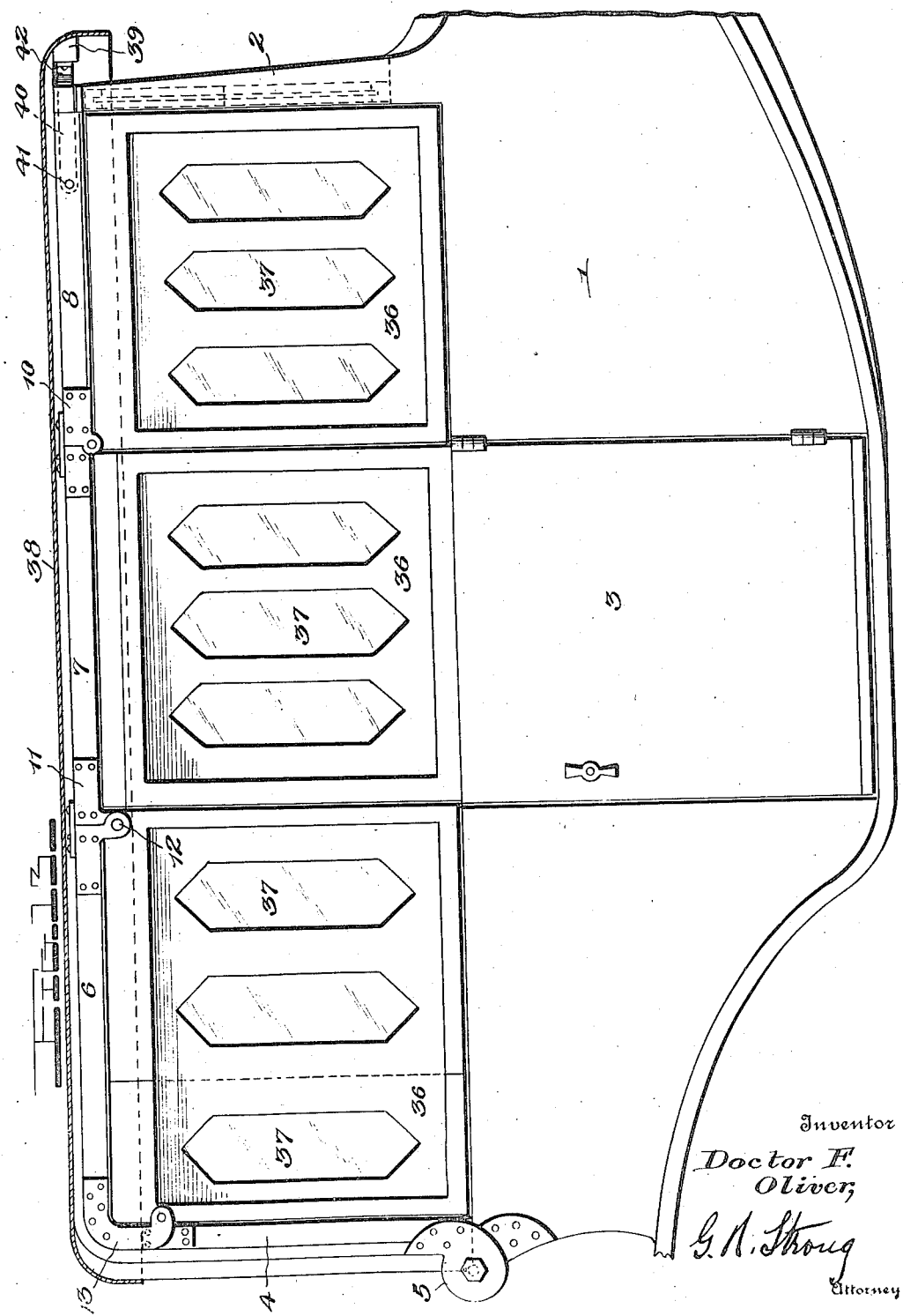

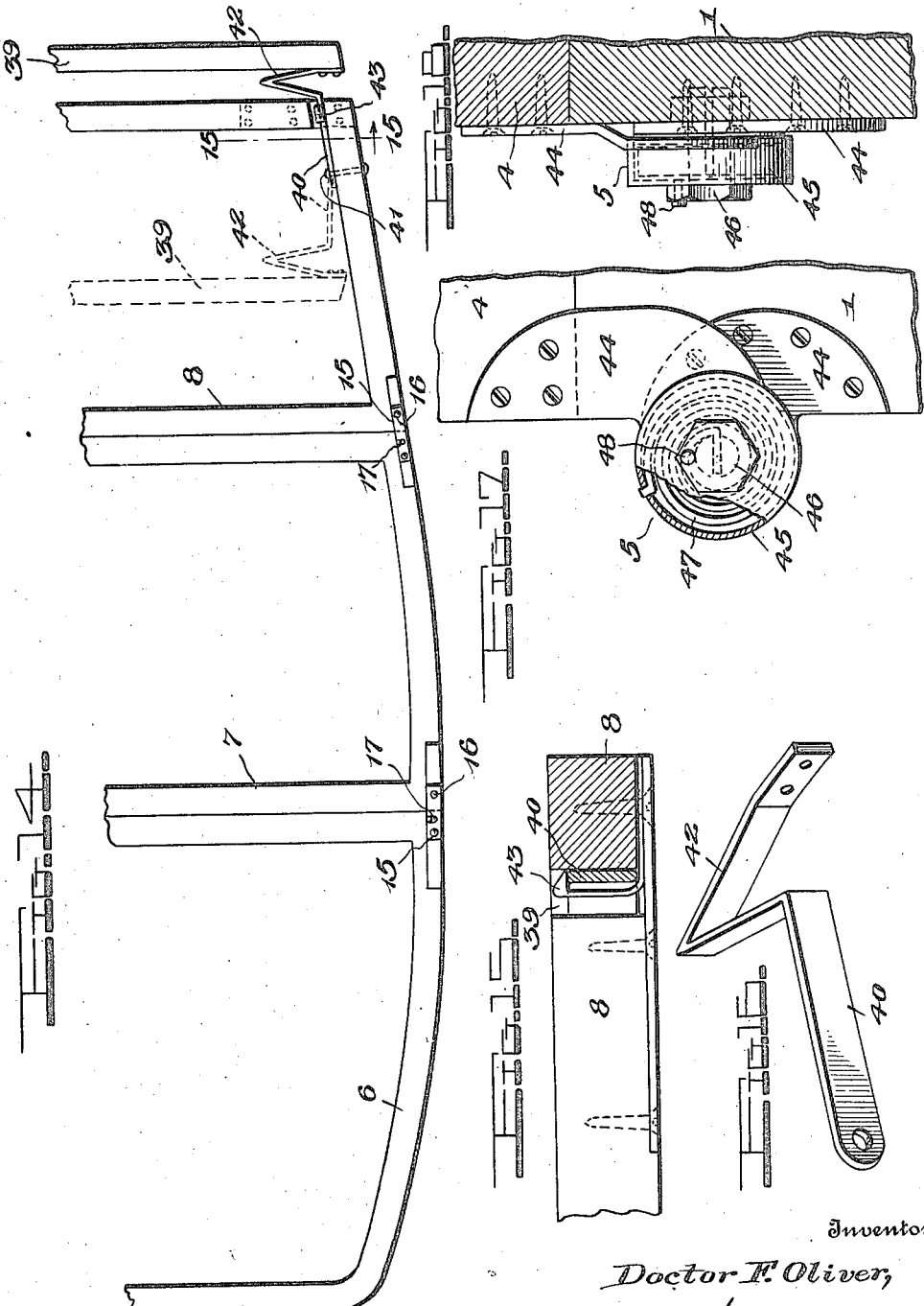

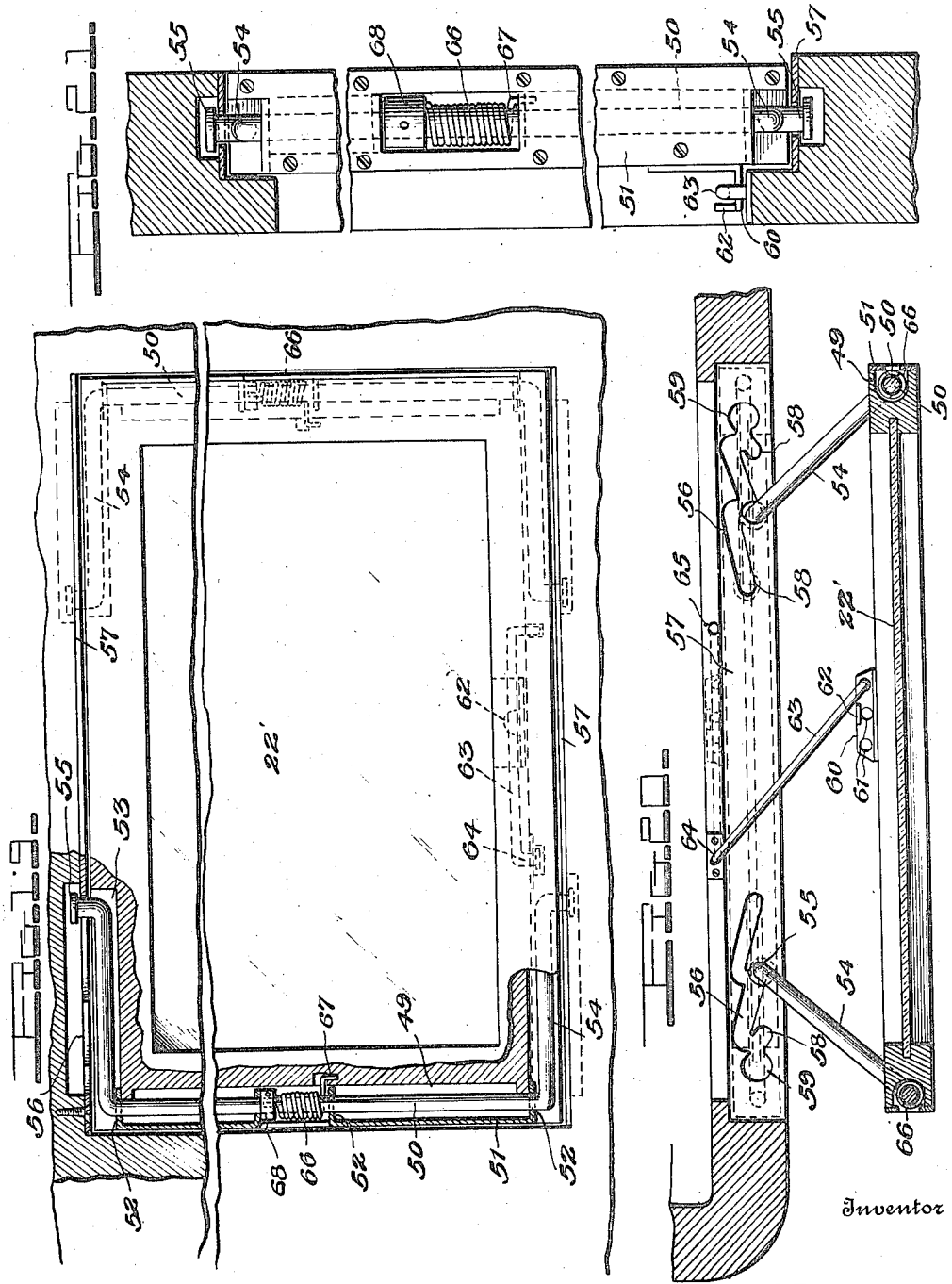

DOCTOR F. OLIVER, OF OAKLAND, CALIFORNIA.

VEHICLE-BODY.

1,236,207.  Specification of Letters Patent.  Patented Aug. 7, 1917.

Application filed December 3, 1915. Serial No. 65,759.

*To all whom it may concern:*

Be it known that I, DOCTOR FRANKLIN OLIVER, a citizen of the United States, residing at Oakland, in the county of Alameda and State of California, have invented new and useful Improvements in Vehicle-Bodies, of which the following is a specification.

This invention relates to certain new and useful improvements in convertible vehicle bodies, with particular reference to the sedan type of body.

Primarily, the object is to provide a top which may be entirely removed, the same preferably comprising hinged sections adapted to fold into a small space and be swung downwardly and in back of the vehicle body when not in use.

Another aim of equal importance resides in an improved window and mounting therefor whereby proper ventilation may be obtained without creating undesirable drafts.

Further, the invention resides in the salient features of construction, arrangements and combinations of parts hereinafter described and claimed, reference being had to the accompanying drawings wherein like numerals designate like parts.

Figure 1 is a fragmentary side elevation of a vehicle embodying the preferred form of my invention;

Fig. 2 is a horizontal longitudinal section thereof taken about on the line 2—2 of Fig. 1;

Fig. 3 shows in vertical section a door with the windows stored in its pocket, the view being taken on the line 3—3 of Fig. 1;

Fig. 4 is a vertical section on the line 4—4 of Fig. 1, illustrating the mounting of the windows;

Fig. 5 is a horizontal section through the door on the line 5—5 of Fig. 1 with the window-sashes stored in its pocket;

Fig. 6 is a fragmentary horizontal section through the vehicle body with a window opened;

Fig. 7 is a side elevation of one lower corner of a sash showing the headed stud;

Fig. 8 is an end elevation thereof;

Fig. 9 is a side elevation of one of the upper corners of a sash disclosing its headed stud;

Fig. 10 is an end elevation thereof;

Fig. 11 is a vertical section illustrating a joint between adjacent top sections and a connection between the top and a sash;

Fig. 12 shows a drain trough provided at each junction of the top section, said view being taken on the line 12—12 of Fig. 11;

Fig. 13 illustrates a slightly modified form of the invention;

Fig. 14 is a fragmentary elevation of the top frame thereof;

Fig. 15, taken on the line 15—15 of Fig. 14, is a section through fabric top tensioning means;

Fig. 16 is a perspective of a detail employed in said means;

Fig. 17 illustrates in side view one of the hinges employed in securing the back top section to the vehicle body;

Fig. 18 is an edge elevation thereof;

Fig. 19 discloses in partial side elevation a modified form of window mounting;

Fig. 20 is a horizontal section through the window further disclosing the window mounting; and Fig. 21 is a vertical section thereof.

The numeral 1 indicates a sedan type of vehicle body having a wind shield 2 and a door 3.

The top consists of a vertical back section 4, secured to the back of the vehicle body 1 by spring hinges 5, and connected sections 6, 7 and 8, the foremost one 8 having its forward end downturned at 9 and seating on the wind shield 2. Top section 8 is connected to adjacent section 7 by hinges 10 for folding thereunder, and these two sections are in turn folded under the top section 6; the section 7 being connected to the latter by hinges 11 which have their pivots considerably offset, as at 12, to permit of proper folding of the sections, as is obvious. The top section 6 is hinged to the back section by connection 13 which is formed to allow the previously folded sections 6, 7 and 8 folding downwardly against the back section, after which the folded top is swung to the dotted line position in Fig. 1 and conveniently secured by a strap 14.

When the top sections are unfolded, the structure is made rigid by latch plates 15 pivoted at 16 to one of two adjacent sections for engaging a pin 17 on the other section and thereby locking the sections extended.

The forward edges of sections 6 and 7 have overlapping portions formed by extending a metal strip 18, partially inclosing a rubber cord 19 which is adapted to overlap the rear edges, respectively, of the sections 7 and 8 to provide a seal against leakage. However, should any water trickle through, the same will be caught by a metal trough 20 secured to forward edge of said sections. The rearward edge of sections 7 and 8 being rabbeted out to receive the trough. The trough opens through an aperture 21 made in the hinges 10 and 11.

The windows or sashes 22 comprise sections secured together by spring hinges 23 designed to hold the sections unfolded, the springs of the hinges being housed and, therefore, not specifically depicted. The bottom and top window rails, defined by the body and top respectively, are mounted by plates 24, having at each end a slot 25 of step formation whereby a longitudinal series of seats 26 are provided. Extending upwardly and downwardly from the corners of the sashes are headed studs or trunnions 27 and 28 which are insertible in and removable from the slots 25 through enlarged entrance openings 29. Thus various arrangements of each sash are obtainable by adjusting the studs at either or both ends of the sash in their respective slots, the tendency of the spring hinges to aline the sash sections providing sufficient pressure to maintain the studs seated.

Each upper stud 27 is carried by yieldable support in the form of a leaf spring 30 adapted to be sprung down into an underlying recess 31 to permit of the stud being withdrawn through the entrance opening 29. The spring 30 terminates in a convenient handle 32 to which access is had when the sash sections are angularly related for enabling the operator spring the support.

When the sash is to be removed, the studs 27 are withdrawn and the upper part swings outwardly so that the lower studs 28 may be lifted from their slots, said latter studs being carried by resilient plates 33 which yield to permit of such removal of the sash.

The windows or sashes may be folded and stored in pockets 34 carried by the doors 3, which latter has its sash 35 slidably mounted to be lowered thereinto when the top is folded.

By this construction either an entirely opened or entirely closed body may be readily provided, the appearance in each instance possessing the neat and graceful lines embodied in the non-convertible type. The convertibility may facilely be accomplished with the parts comprising a rigid structure at all times.

In the modification illustrated in Figs. 13, 14, 15 and 16, the sash frames are covered with fabric 36 having isinglass lights 37.

The top in this embodiment is covered by a single length of fabric 38, the front end of which is secured to a transverse roof member or bar 39. The top comprises the hinged sections 4, 6, 7 and 8 and when it is desired to fold the same, the fabric covering 38 must necessarily be slackened.

To this end the bar 39 is supported by arms 40 to swing about their pivots 41 to lie disposed in the dotted line position in Fig. 14. This operation will obviously slacken the fabric and permit of the top being folded. Between the pivot 41 and the bar 39 each arm embodies an intervening spring section 42 adapted to maintain a tension on the covering, as shown in Fig. 13. When in this forward position, the arms 40 are engaged by spring latches 43 as most clearly depicted in Figs. 14 and 15.

The spring hinge 5 comprises a pair of wings 44, one of which is provided with a cylindrical casing 45 connected to the other wing by a pivot bolt 46. A coiled spring 47 is housed within the casing and has its opposite ends secured to the latter and the pivot bolt. Tension of the spring may be varied by turning the bolt and setting the screw 48 into provided apertures in the casing.

These spring hinges 5 facilitate swinging back top section 4 to and from upright position and aid in maintaining the top up.

In the modified window mounting, the sash 22' is solid and provided in its ends with vertical chambers or recesses 49 extending throughout. Shafts 50 are inclosed within these chambers by vertical plates 51 having apertured ears 52 in which the shafts are journaled. Extending inwardly from the ends of the sash are cut outs 53 in which the terminal crank arms 54 of the shafts are adapted to rest when the sash is closed or removed. The free ends of the crank arms 54 terminate in angular headed studs 55 for engaging in the slots 56 of the window sill or rail plates 57. These slots have series of seats 58 arranged oppositely to seats 26 and are provided with terminal entrance openings 59 disposed at the outer ends thereof through which the studs 55 are inserted by springing the crank arms.

On the inner side of the sash is a plate 60 having a series of holes 61 and an upstanding lug 62 on its outer edge. In these holes 61, the free or hooked terminal of a securing rod 63 is adapted for selective engagement for steadying the sash when opened, otherwise, the sash would have a tendency to swing or oscillate. The securing rod is pivoted at 64 on the window sill and, when the sash is closed is adapted to have its hooked end engaged in an opening 65 provided in the sill. When engaged in this opening 65, the securer overlies the plate 60 between the lug 62 and the sash and thereby locks the latter closed.

Between two adjacent ears 52 is a torsional spring 66 coiling about each shaft 50 which tends to hold the crank arms within the cut outs 53. One end of each spring is anchored in the sash, as at 67, and the other end secured to an adjustable collar 68 on the shaft. Either or both ends of the sash may be opened by selecting the proper seats 58 in which to engage the studs 55.

The operation is obvious from the foregoing, it being noted that proper ventilation is obtainable without placing the occupants in any draft whatever. Furthermore, a collapsible top is provided having a smooth, metal covering and, thereby producing a neat appearance.

Having thus described my invention, what I claim as new and desire to secure by Letters Patent, is:—

1. A convertible vehicle body having a window opening defined by upper and lower rails, each rail formed with spaced slots provided with a series of communicating seats, a sash for the window opening normally in alinement with the body walls and adapted to be moved out of alinement for opening the window, studs carried by the sash for engaging selectively in the seats, and spring means carried by the sash and tending to move the studs transversely of the rail slots to thereby retain them in their seats and the sash out of alinement with the body walls.

2. In a vehicle, a window opening having upper and lower rails each provided with a series of seats, a sash for the window opening, a vertical shaft journaled on the sash and having right angular terminals adapted to receive the sash therebetween, and studs provided on the shaft terminals to engage in the rail seats.

3. In a vehicle, a window opening having upper and lower rails each provided with a series of seats, a sash for the window opening having one vertical edge grooved, a shaft journaled in the groove of the sash and provided at its upper and lower ends with parallel horizontal arms terminating in headed studs adapted to engage in the rail seats, and a spring arranged in the sash groove to exert a torsional force on the shaft.

4. In a convertible vehicle body, a foldable top comprising hingedly connected sections and a metal drain trough interposed between the opposing edges of the top sections to be concealed thereby and connected to one of the top sections.

5. A convertible vehicle body having a window opening defined by upper and lower rails, each rail being formed with spaced series of horizontal and connected seats, a sash for the window opening, means carried by the sash to engage selectively in the seats, and spring means carried by the sash and spaced from said first means for moving the latter transversely of the series of seats and thereby hold the same engaged in the selected seats.

6. In a convertible vehicle body having a window opening, a window rail provided with a slot having a seat and an entrance opening, a sash normally in the window opening, and a yieldably mounted headed stud carried by the sash for operating in the rail slot and engaging in said seat to hold the sash out of the window opening.

7. A convertible vehicle body having a window opening, upper and lower rails for the window opening each of which is formed with a slot having a seat and an entrance opening, a sash normally in the window opening, and yieldably mounted headed studs carried by the sash for engaging in the rail seats to hold the sash out from the window opening and removable therefrom through the entrance openings of the rail slots.

8. A convertible vehicle body having a foldable top providing a window opening between the latter and the body, an upper window rail carried by the top, a lower window rail carried by the body, each rail having a slot formed with a seat and an entrance opening, a sash interposed between the top and body and seating on the window rails, and headed studs yieldably carried by the sash and slidably engaging in the rail slots for engaging the rail seats to hold the sash from the rails.

9. A convertible vehicle body having a window opening, upper and lower window rails provided with slots of step formation, a sash seating on the rail, shafts journaled on the sash and having crank arms terminating in studs adapted to engage in the rail slots, and spring means normally tending to hold the crank arms of the shafts against the sash.

10. A convertible vehicle body having a window opening, upper and lower window rails provided with slots of step formation, a sash seating on the rail, shafts journaled on the sash and having crank arms terminating in studs adapted to engage in the rail slots, spring means normally tending to hold the crank arms of the shafts against the sash, and means for holding the sash against movement when opened.

11. A convertible vehicle body having a window opening, upper and lower window rails provided with slots of step formation, a sash seating on the rail, shafts journaled on the sash and having crank arms terminating in studs adapted to engage in the rail slots, spring means normally tending to hold the crank arms of the shafts against the sash, a perforated plate carried by the sash, and a securing rod pivoted to the body and adapted to engage in the perforations of the plate to hold the sash against movement when opened.

12. In a vehicle, an upright back member hinged for swinging rearwardly, a foldable top frame including a rear section, a forward section and an intermediate section, hinge connections between the top sections and between the rear top section and the back member, the pivots of the hinge connections being disposed downwardly from the top frame a progressively greater distance in a rearward direction to permit the top sections folding downwardly in a winding manner with the forward and intermediate sections folding between the rear top section and the back member, a single fabric covering connected at one end to the rear top section, and resilient means pivotally connecting the opposite end of the covering to the forward top section for operatively holding the covering taut over the top frame and providing for the slacking of said covering during the folding of the top frame.

In testimony whereof I have hereunto set my hand in presence of two subscribing witnesses.

DOCTOR F. OLIVER.

Witnesses:
FANNIE MANDERBACH,
JOHN A. WHELAN.